(12) United States Patent
Son et al.

(10) Patent No.: US 11,155,960 B2
(45) Date of Patent: Oct. 26, 2021

(54) ARTIFICIAL LEATHER HAVING WATER-BASED POLYURETHANE FOAM LAYER AND METHOD OF MANUFACTURING THE SAME

(71) Applicant: LG HAUSYS, LTD., Seoul (KR)

(72) Inventors: Su Hyun Son, Ulsan (KR); Yong Bae Jung, Ulsan (KR)

(73) Assignee: LG Hausys, Ltd., Seoul (KR)

( * ) Notice: Subject to any disclaimer, the term of this patent is extended or adjusted under 35 U.S.C. 154(b) by 0 days.

(21) Appl. No.: 16/339,286

(22) PCT Filed: Nov. 16, 2017

(86) PCT No.: PCT/KR2017/012960
§ 371 (c)(1),
(2) Date: Apr. 3, 2019

(87) PCT Pub. No.: WO2018/131783
PCT Pub. Date: Jul. 19, 2018

(65) Prior Publication Data
US 2020/0040522 A1 Feb. 6, 2020

(30) Foreign Application Priority Data
Jan. 12, 2017 (KR) .......................... 10-2017-0005370

(51) Int. Cl.
*D06N 3/00* (2006.01)
*C08J 5/12* (2006.01)
(Continued)

(52) U.S. Cl.
CPC ............ *D06N 3/0013* (2013.01); *C08J 5/128* (2013.01); *C08J 9/36* (2013.01); *C09J 5/00* (2013.01);
(Continued)

(58) Field of Classification Search
CPC .... D06N 3/0013; D06N 3/14; D06N 2209/06; D06N 2209/126; D06N 2211/263;
(Continued)

(56) References Cited

U.S. PATENT DOCUMENTS 4,017,656 A * 4/1977 Lasman .................. B32B 27/40
428/86
6,114,260 A * 9/2000 Kim ........................ D06N 3/005
442/76
(Continued)

FOREIGN PATENT DOCUMENTS

CN 101941321 A * 1/2011
JP 2947778 B2 9/1999
(Continued)

OTHER PUBLICATIONS

Espacenet Translation of JP-2013072141-A (Year: 2019).*
Espacenet Translation of CN-101941321-A (Year: 2020).*
Espacenet Translation of JP-2012127010-A (Year: 2020).*

*Primary Examiner* — Michael Zhang
(74) *Attorney, Agent, or Firm* — Dentons US LLP

(57) ABSTRACT

The present invention relates to artificial leather having a water-based polyurethane foam layer including a fabric layer 110; a binder layer 111 laminated on the upper portion of the fabric layer 110; a water-based polyurethane foam layer 120 laminated on the upper portion of the fabric layer 110; a skin layer 130 laminated on the upper portion of the water-based polyurethane foam layer 120; and a surface treatment layer 140 laminated on the upper portion of the skin layer 130, wherein open cells are formed in the water-based polyurethane foam layer 120 through mechanical foaming. According to the present invention, a water-based polyurethane foam layer having open cells formed through mechanical foaming is applied to artificial leather for automobile seats.

7 Claims, 5 Drawing Sheets

(51) Int. Cl.
*C08J 9/36* (2006.01)
*C09J 5/00* (2006.01)
*C09J 175/04* (2006.01)
*D06N 3/14* (2006.01)

(52) U.S. Cl.
CPC .............. *C09J 175/04* (2013.01); *D06N 3/14* (2013.01); *C08J 2205/05* (2013.01); *C08J 2375/04* (2013.01); *C09J 2400/243* (2013.01); *C09J 2400/263* (2013.01); *C09J 2475/00* (2013.01); *C09J 2475/006* (2013.01); *D06N 2209/06* (2013.01); *D06N 2209/126* (2013.01); *D06N 2211/263* (2013.01)

(58) Field of Classification Search
CPC ....... C08J 5/128; C08J 5/00; C08J 9/36; C08J 9/30; C08J 2205/05; C08J 2375/04; C09J 175/04; C09J 2400/243; C09J 2400/263; C09J 2475/00; C09J 2475/006; C09D 175/04; C08G 2101/0066
See application file for complete search history.

(56) References Cited

U.S. PATENT DOCUMENTS

| | | | | |
|---|---|---|---|---|
| 6,353,051 | B1* | 3/2002 | Huang | D06N 3/042 |
| | | | | 252/8.61 |
| 2003/0017322 | A1* | 1/2003 | Kim | D06N 3/14 |
| | | | | 428/315.7 |
| 2009/0311480 | A1* | 12/2009 | Fischer | D06N 3/0097 |
| | | | | 428/160 |

FOREIGN PATENT DOCUMENTS

| | | | |
|---|---|---|---|
| JP | 2012127010 | A * | 7/2012 |
| JP | 2013072141 | A * | 4/2013 |
| JP | 5734801 | B2 | 6/2015 |
| KR | 1020030011576 | A | 2/2003 |
| KR | 1020090095044 | A | 9/2009 |
| KR | 101202966 | B1 | 11/2012 |

* cited by examiner

[FIG. 1]
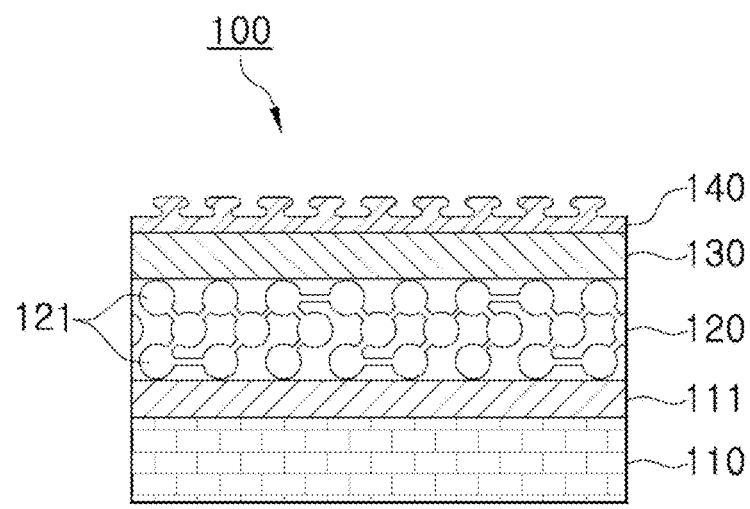
[FIG. 2]
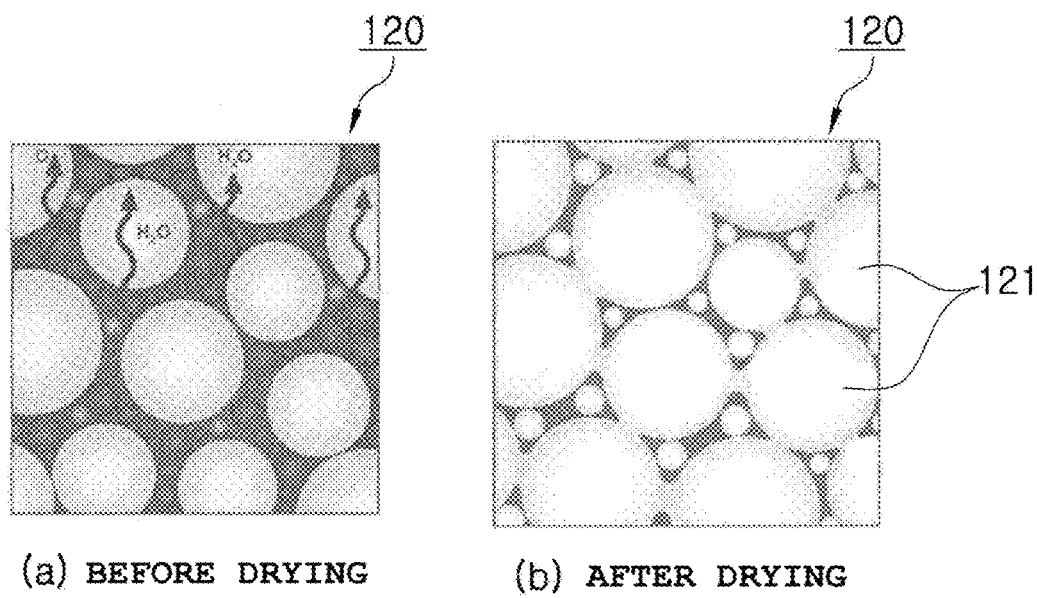
(a) BEFORE DRYING    (b) AFTER DRYING

[FIG. 3]
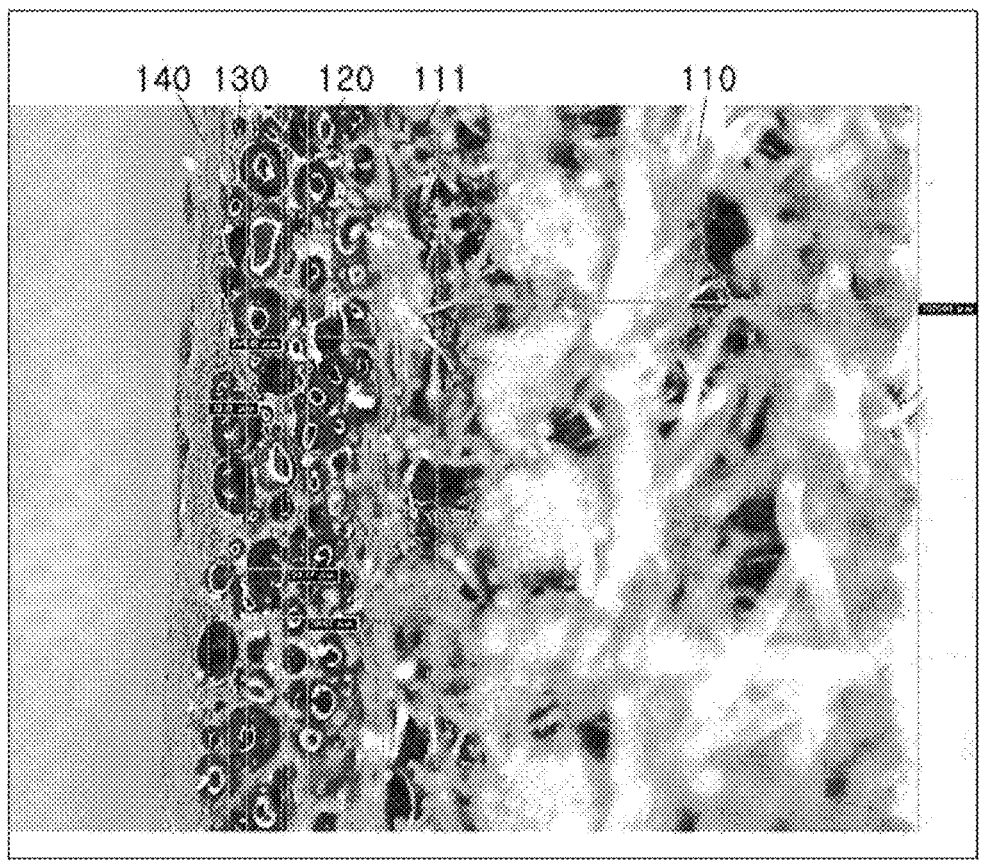
[FIG. 4]
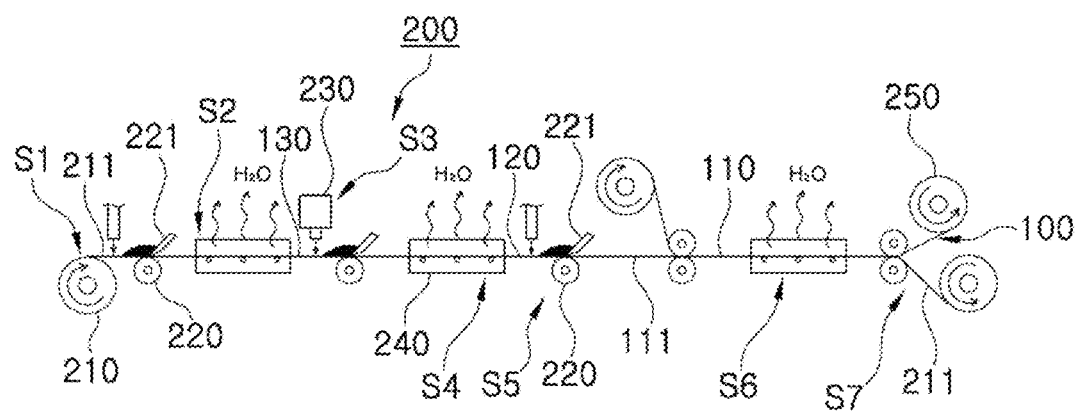

[FIG. 5]
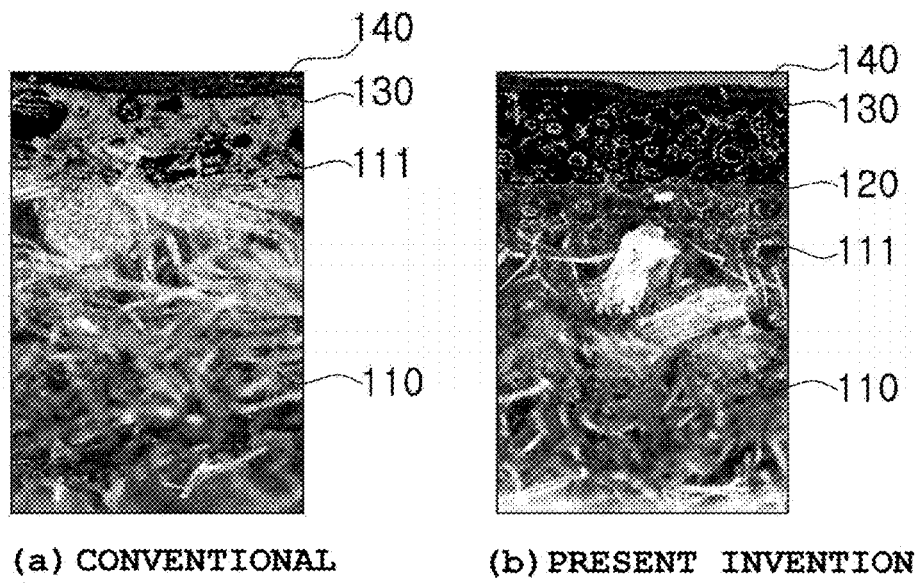
(a) CONVENTIONAL  (b) PRESENT INVENTION
[FIG. 6]
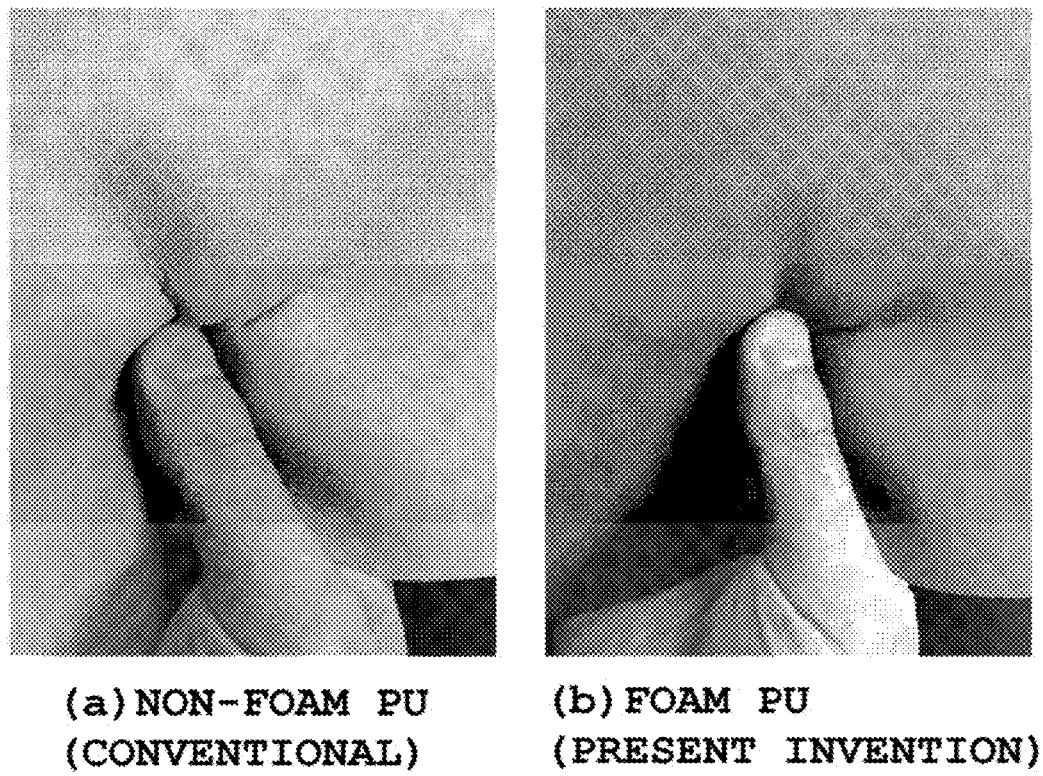
(a) NON-FOAM PU (CONVENTIONAL)  (b) FOAM PU (PRESENT INVENTION)

[FIG. 7]
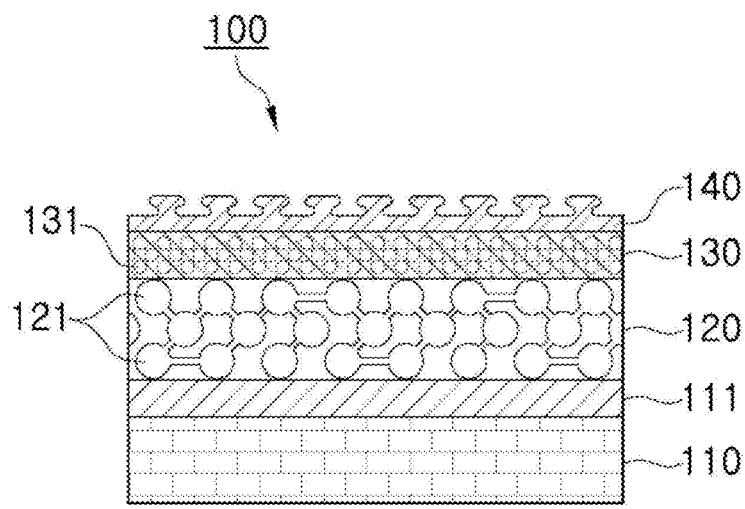
[FIG. 8]
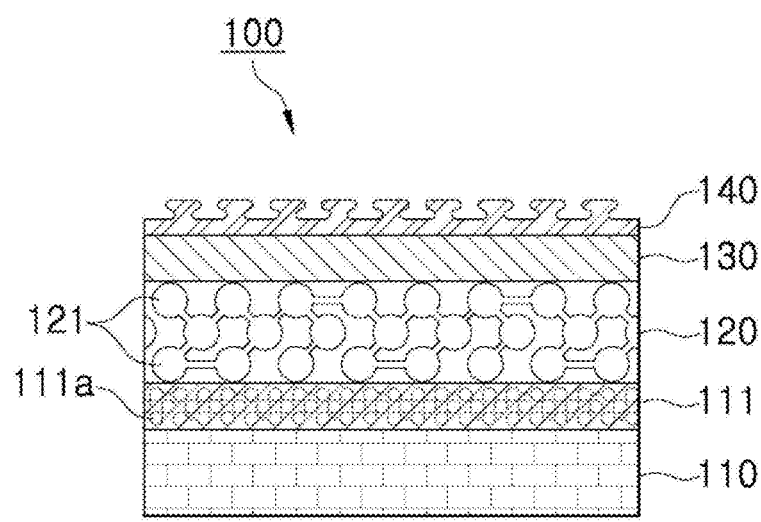

[FIG. 9]
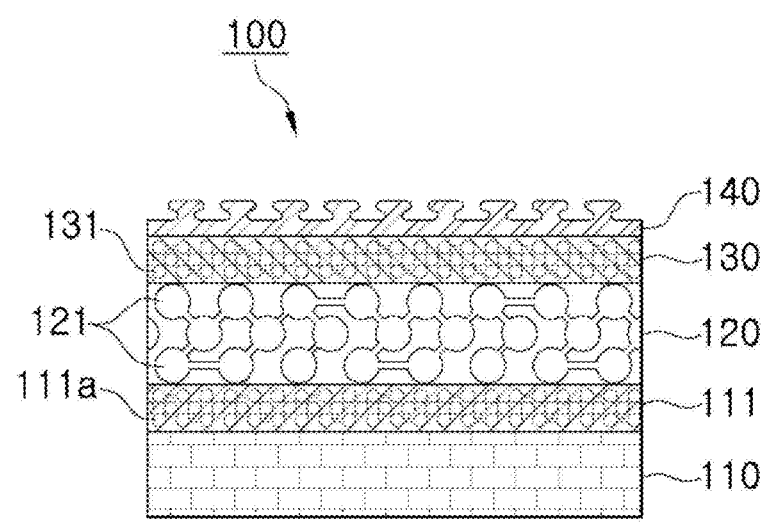

ARTIFICIAL LEATHER HAVING WATER-BASED POLYURETHANE FOAM LAYER AND METHOD OF MANUFACTURING THE SAME

This application is a national stage of international Application No. PCT/KR2017/012960 filed Nov. 16, 2017, which claims the benefit of Korean Patent Application No. 10-2017-0005370, filed Jan. 12, 2017, the entire contents of which are incorporated herein by reference.

TECHNICAL FIELD

The present invention relates to artificial leather, and more particularly, to artificial leather having a water-based polyurethane foam layer and a method of manufacturing the same. According to the present invention, when artificial leather for automobile seats is manufactured, a water-based polyurethane foam layer having open cells is included in the artificial leather. Therefore, the artificial leather has excellent cushioning and moisture permeability, may lower the surface temperature of automobile seats in summer, and may prevent formation of folded wrinkles.

BACKGROUND ART

In general, the inside of an automobile is considered as a second home. In recent years, as demand for a pleasant and comfortable driving environment in automobiles has increased, functional seats are attracting considerable attention.

Natural leather or polyvinyl chloride (PVC) and polyurethane (PU) artificial leathers are widely used as materials for automobile seats. Artificial leather is cheaper than natural leather. However, in terms of aesthetics and functionality that provides a pleasant driving environment, natural leather is remarkably superior to artificial leather.

Accordingly, efforts have been made to develop artificial leather that can satisfy the aesthetics and functions of natural leather at a low cost. That is, in terms of functionality, natural leather has high moisture permeability and may lower the surface temperature or seats in summer since moisture and heat are transmitted through pores formed in the surface and inside of the natural leather.

Artificial leather having a foam layer that mimics natural leather was disclosed in KR 10-0328301 B1 (publication date: Mar. 16, 2002).

Specifically, artificial leather can be generally manufactured by a dry method, a wet method, or a paper method. In the dry method, a composition containing toluene, acetone, isopropyl, alcohol, polyurethane, and the like is applied to release paper, and then the release paper is attached to fiber fabric using an adhesive. In the wet method, a composition containing polyurethane, dimethyl formaldehyde, and the like is applied to fiber fabric to form a leather layer, and then curing is performed by passing the fabric through hot water. In the paper method, artificial leather is manufactured in a manner similar to the above dry method.

However, conventional artificial leather has limitations in realizing the physical strength, structure, performance, and appearance of natural leather. That is, the conventional artificial leather is not soft, and has stiff texture and poor durability. In addition, since organic chemicals are used in the manufacturing process of the conventional artificial leather, there is a risk of fire, and separate treatment facilities are required to prevent foul odor and pollution.

In the dry method and the paper method, artificial leather is manufactured by attaching a leather layer and fabric using an adhesive or the like. Accordingly, the artificial leather manufactured by the dry or paper method is poor in air permeability and moisture permeability. On the other hand, artificial leather manufactured by the wet method has some degree of air permeability and moisture permeability. In the wet method, polyurethane, which has excellent physical properties such as elasticity and can impart a sense of volume to artificial leather, has been mainly used as an artificial leather material.

The polyurethane (PU) artificial leather is manufactured by polymerizing urethane raw materials including polyol, isocyanate, a chain extender, and the like in an organic solvent such as dimethylformamide (DMF). In this case, as a result of substitution reaction between water and dimethylformamide, voids are formed between fiber and polyurethane so that the PU artificial leather has microporous structures. The microporous structures impart a sense of volume to the artificial leather. In addition, by controlling the size of the voids by changing the rate of the substitution reaction, a sense of volume may be improved.

Conventionally, solvent-based polyurethane, which is a main ingredient of polyurethane artificial leather, is prepared by solution polymerization due to the hydrophobicity of the raw materials. In this case, since dimethylformamide (DMF), which is an organic solvent, is used as a reaction medium or a diluting solvent, environmental pollution such as air and water pollution is caused by discharge of a toxic DMF solvent during manufacture and application processes. In particular, when the artificial leather is applied to a closed space such as the inside of an automobile, discomfort may be caused by DMF-specific foul odor.

In addition, the solvent-based polyurethane has a weak hydrolysis resistance to water. Therefore, when the solvent-based polyurethane is exposed to moisture for a long period of time, the solvent-based polyurethane may be hydrolyzed and the rubbing fastness thereof may be lowered. In addition, due to steady increase in solvent price, the conventional solvent-based polyurethane is gradually being replaced by water-based polyurethane.

In the case of water-based polyurethane, dimethylformamide, which is an organic solvent, is not used. Therefore, water-based polyurethane is attracting attention as an eco-friendly material. However, water-based polyurethane is not excellent in adhesiveness and mechanical properties, and has low drying speed and storage stability.

In addition, in the case of artificial leather manufactured using water-based polyurethane, voids are not formed between fibers constituting fabric and a urethane resin, resulting in weak elasticity. In addition, the physical strength of artificial leather manufactured using water-based polyurethane is lower than that of natural leather.

DISCLOSURE

Technical Problem

Therefore, the present invention has been made in view of the above problems, and it is one object of the present invention to provide artificial leather having a water-based polyurethane foam layer. According to the present invention, a water-based polyurethane foam layer having open cells formed through mechanical foaming is applied to artificial leather for automobile seats. The artificial leather having the water-based polyurethane foam layer has excellent cushioning and moisture permeability, may lower the surface temperature of automobile seats in summer, and may prevent formation of folded wrinkles in automobile seats.

Technical Solution

In accordance with one aspect of the present invention, provided is artificial leather having a water-based polyurethane foam layer including a fabric layer 110; a binder layer 111 laminated on the upper portion of the fabric layer 110; a water-based polyurethane foam layer 120 laminated on the upper portion of the fabric layer 110; a skin layer 130 laminated on the upper portion of the water-based polyurethane foam layer 120; and a surface treatment layer 140 laminated on the upper portion of the skin layer 130, wherein the water-based polyurethane foam layer 120 includes open cells formed through mechanical foaming.

In accordance with another aspect of the present invention, provided is a method of manufacturing artificial leather having a water-based polyurethane foam layer including a first step of conveying release paper 211 wound on a winding roll 210 in one direction; a second step of applying a gel-phase resin mixture to a predetermined thickness to the upper portion of the conveyed release paper 211, and performing heat drying to form a skin layer 130; a third step of preparing a foam paste in which fine air layers are formed using a foam generator; a fourth step of applying the prepared foam paste to the upper portion of the skin layer 130, and performing curing and drying to form a water-based polyurethane foam layer having open cells 120; a fifth step of applying a binder layer 111 to the upper portion of the water-based polyurethane foam layer 120; a sixth step of laminating fabric on the upper portion of the applied binder layer 111, and performing drying and curing to form a fabric layer 110; a seventh step of peeling off the release paper 211; and an eighth step of forming a surface treatment layer 140 on the upper portion of the skin layer 130 from which the release paper 211 has been peeled off.

Advantageous Effects

In the middle of the artificial leather according to the present invention having the above-described configuration, a water-based polyurethane foam layer having open cells formed through mechanical foaming instead of conventional chemical foaming is formed. Accordingly, the artificial leather has superior moisture permeability to conventional artificial leather, and has excellent cushioning, moisture permeability and heat dissipation ability. Therefore, the artificial leather can lower the surface temperature of automobile seats in summer. In addition, in manufacturing the artificial leather, the thickness of a foam layer can be easily adjusted.

In particular, in the case of water-based polyurethane, which is an ingredient of the water-based polyurethane foam layer, dimethylformamide, an organic solvent, is not used, thereby improving environmental friendliness.

In addition, when the artificial leather in which a water-based polyurethane foam layer having a predetermined thickness and including open cells is formed is applied to automobile seats, formation of folded wrinkles can be prevented.

DESCRIPTION OF DRAWINGS

FIG. 1 is a side sectional view of the laminated structure of artificial leather having a water-based polyurethane foam layer according to the present invention.

FIGS. 2(a) and 2(b) show the state of a water-based polyurethane foam layer according to the present invention before and after performing foaming, respectively.

FIG. 3 is an image showing the results of measuring the thickness of each layer constituting artificial leather according to the present invention.

FIG. 4 is a drawing showing a manufacturing process of artificial leather using an artificial leather manufacturing apparatus according to the present invention.

FIG. 5 shows an enlarged image of the laminated structure of artificial leather having a water-based polyurethane foam layer according to the present invention.

FIG. 6 shows test results for judging whether folded wrinkles are formed in artificial leather according to the present invention and conventional artificial leather.

FIGS. 7 to 9 illustrate artificial leathers according to other embodiments of the present invention.

BEST MODE

Hereinafter, the functions or constructions of preferred embodiments of the present invention will now be described more fully with reference to the accompanying drawings.

Here, when reference numerals are applied to constituents illustrated in each drawing, it should be noted that like reference numerals indicate like elements throughout the specification.

FIG. 1 is a side sectional view of the laminated structure of artificial leather having a water-based polyurethane foam layer according to the present invention, and FIGS. 2(a) and 2(b) show the state of a water-based polyurethane foam layer according to the present invention before and after performing foaming, respectively.

Referring to FIG. 1, an artificial leather 100 having a water-based polyurethane foam layer according to a preferred embodiment of the present invention includes a fabric layer 110, a water-based polyurethane foam layer 120 laminated on the upper portion of the fabric layer 110, a skin layer 130 laminated on the upper portion of the water-based polyurethane foam layer 120, and a surface treatment layer 140 laminated on the upper portion of the skin layer 130 to prevent formation of surface scratches and improve abrasion resistance.

The construction of the artificial leather according to the present invention will be described in detail as follows.

First, any one of fabric, knits, impregnated tricot, impregnated nonwoven fabric, dope dyed yarn, and nonwoven fabric may be used as the fabric layer 110.

In this case, since the water-based polyurethane foam layer 120 is laminated on the fabric layer 110 via a binder layer 111, the fabric layer 110 and the water-based polyurethane foam layer 120 may be firmly adhered to each other. Preferably, the binder layer 111 may be formed using any one of a water-based polyurethane binder, an oil-based polyurethane binder, a solvent-free polyurethane binder, and a hot-melt adhesive.

In addition, open cells 121 are formed in the water-based polyurethane foam layer 120 through mechanical foaming.

Specifically, in the manufacturing process of the artificial leather 100, water-based polyurethane used as a material in formation of the water-based polyurethane foam layer 120 is mixed and kneaded with high-pressure anhydrous air supplied through a foam generator.

In addition, as shown in FIG. 2(a), a paste (water-based PU paste) in a state wherein a plurality of fine air layers (bubbles) is formed therein is applied to the upper portion of a corresponding layer. Then, when the paste is subjected to a predetermined drying and curing process in an oven, as shown in FIG. 2(b), the open cells 121 may be formed.

Referring to FIG. 3, the size of the open cells 121 may be 20 to 200 μm, preferably 50 to 100 μm.

In addition, the water-based polyurethane foam layer 120 is preferably formed to have a thickness of 50 to 600 μm. That is, when the water-based polyurethane foam layer 120 is formed to have a thickness of 50 μm or less, it is difficult to impart proper cushioning. On the other hand, when the water-based polyurethane foam layer 120 is formed to have a thickness of 600 μm or more, more cushioning than necessary may be imparted, and material cost may be increased.

In addition, the water-based polyurethane foam layer 120 is preferably formed to have a density of 200 to 850 g/L. That is, when the density of the water-based polyurethane foam layer 120 is 200 g/L or less, more open cells 121 are formed than necessary. As a result, the stability of the foam layer 120 deteriorates. On the other hand, when the density of the water-based polyurethane foam layer 120 is 850 g/L or more, the amount of air to be supplied is small and thus, it is difficult to form as many open cells 121 as required. As a result, the stability of the foam layer 120 deteriorates.

In addition, the skin layer 130 may be formed of water-based polyurethane or oil-based polyurethane.

In addition, the surface treatment layer 140 may be formed through any one of water-based surface treatment, oil-based surface treatment, and oil-based/water-based complex surface treatment.

Hereinafter, a method of manufacturing the artificial leather having a water-based polyurethane foam layer according to the present invention having the above-described structure will be described with reference to FIG. 4.

FIG. 4 is a drawing showing a manufacturing process of artificial leather using an artificial leather manufacturing apparatus 200 according to the present invention.

First, release paper 211 wound on a winding roll 210 is conveyed in one direction (S1). Here, the release paper 211 is provided so that an initial gel-phase resin mixture can be conveyed in a state of being applied to the release paper 211, and is peeled off after the manufacturing process of the artificial leather 100 is completed.

A gel-phase resin mixture is applied to the upper portion of the conveyed release paper 211 to a predetermined thickness, and heat drying is performed to form the skin layer 130 (S2). In this case, the resin mixture is uniformly applied to the upper side of the release paper 211 to a predetermined thickness while passing through coating knives 221 provided directly above conveying rollers 220.

A foam paste in which fine air layers are formed is prepared using a foam generator 230 (S3). In this case, the foam generator 230 mixes anhydrous air with a pressure of 6 to 8 bar and water-based polyurethane. Through this process, a paste (foam paste) containing water-based polyurethane in which plural air cells (bubbles) are formed may be prepared. At this time, the air cells in the paste are still not connected to each other (see FIG. 2(a)).

The foam paste prepared in the foam generator 230 is applied to the upper portion of the skin layer 130, and then a predetermined drying and curing process is performed in an oven 240 to form the water-based polyurethane foam layer 120 having a thickness of 50 to 600 μm and including the open cells 121 (see FIG. 2(b)) (S4).

Then, a binder layer 111 is applied to the upper portion of the water-based polyurethane foam layer 120 (S5).

Fabric is laminated on the upper portion of the applied binder layer 111, and heat drying is performed to form the fabric layer 110 (S6).

In this case, the heat drying process, the curing and drying process, and the drying and curing process for laminating the skin layer 130, the foam layer 120, and the fabric layer 110 constituting the artificial leather 100 are preferably performed in an oven at 80 to 140° C. for 2 to 5 minutes.

In addition, the release paper 211 is peeled off, and the manufactured artificial leather 100 is wound on a separated winding roll 250 (S7).

In the artificial leather 100 from which the release paper 211 is peeled off, the surface treatment layer 140 is formed on the upper portion of the skin layer 130 through another separate device.

As shown in FIG. 5(b), the artificial leather 100 manufactured through the above-described process includes the water-based polyurethane foam layer 120 in which the open cells 121 are formed. Thus, the artificial leather 100 has excellent cushioning, moisture permeability, and heat dissipation ability, and may lower the surface temperature of automobile seats in summer. As a comparative example, in FIG. 5(a), a magnified image of conventional artificial leather not including the water-based polyurethane foam layer 120 according to the present invention is shown.

The moisture permeability of the artificial leather 100 including the water-based polyurethane foam layer 120 manufactured by the manufacturing process of the present invention (Example shown in FIG. 1) and the moisture permeability of artificial leather and natural leather manufactured using other materials and by other methods were measured, and the results are shown in Table 1 below.

TABLE 1

| Samples | Moisture permeability $(g/m^2 \cdot 24\ h)$ |
|---|---|
| Example of the present invention (foam water-based PU) (Example of FIG. 1) | 308 |
| Comparative Example 1 (water-based PU) | 129 |
| Comparative Example 2 (oil-based PU) | 199 |
| Comparative Example 3 (PVC) | 10 |
| Comparative Example 4 (natural leather) | 557 |

As shown in Table 1, it can be seen that the artificial leather 100 according to the present invention has a moisture permeability of 308 $g/m^2 \cdot 24$ h. That is, the artificial leather 100 of the present invention has better moisture permeability than artificial leather not including the water-based polyurethane foam layer 120 according to Comparative Examples 1 to 3. In addition, the measured value of the artificial leather 100 is close to that of natural leather of Comparative Example 4.

In addition, when the artificial leather 100 in which the water-based polyurethane foam layer 120 having a predetermined thickness and including the open cells 121 according to the present invention is formed is applied to automobile seats, the artificial leather 100 may prevent formation of folded wrinkles.

That is, when conventional artificial leather not including a foam layer or conventional artificial leather including closed cells formed through chemical foaming is used to cover automobile seats, folded wrinkles may be formed in rounded portions. The wrinkled portions may be damaged due to frequent contact with vehicle occupants.

Hereinafter, whether folded wrinkles are formed when the artificial leather 100 according to the present invention is applied to automobile seats will be described. FIGS. 6(a) and 6(b) show the results of testing whether folded wrinkles are formed in the artificial leather according to the present invention and conventional artificial leather.

First, conventional non-foam artificial leather fabric and the foam fabric of the present invention (the artificial leather 100) were prepared. Then, each fabric was pressed with the thumb while holding the fabric by hand.

As a result, as shown in FIG. 6(a), it can be seen that folded wrinkles are formed on the surface of the conventional non-foam fabric.

On the other hand, as shown in FIG. 6(b), it can be seen that folded wrinkles are hardly formed on the surface of the foam fabric according to the present invention.

The artificial leather 100 according to the present invention includes the water-based polyurethane foam layer 120 including the open cells 121 formed by mechanical foaming instead of conventional chemical foaming. Thus, the artificial leather 100 has excellent cushioning, moisture permeability, and heat dissipation ability, and may lower the surface temperature of automobile seats in summer.

In particular, in the case of water-based polyurethane, which is a main ingredient of the water-based polyurethane foam layer 120, dimethylformamide, an organic solvent, is not used, thereby improving environmental friendliness.

In addition, when the artificial leather 100 in which the water-based polyurethane foam layer 120 having a predetermined thickness and including the open cells 121 is formed is applied to automobile seats, formation of folded wrinkles may be prevented.

The preferred embodiments of the present invention have been described with reference to the accompanying drawings. However, the scope of the present invention is not limited by these embodiments. In addition, it will be apparent to those skilled in the art that various changes and modifications may be made without departing from the spirit and scope of the present invention.

In this case, in the present invention, the case wherein the open cells 121 are formed in the water-based polyurethane foam layer 120 has been described as an example. However, the present invention is not limited thereto.

For example, as shown in FIGS. 7 to 9, in addition to the water-based polyurethane foam layer 120, open cells 111a and 131 may be formed in any one of the binder layer 111 and the skin layer 130, or in both the binder layer 111 and the skin layer 130 through foaming. Accordingly, the moisture permeability of the artificial leather 100 may be efficiently improved.

In particular, when the open cells 121 and 131 are formed in both the foam layer 120 and the skin layer 130 constituting the artificial leather 100 of the present invention shown in FIG. 7, as shown in Table 2, it can be seen that the artificial leather 100 has a moisture permeability of 607 g/m²·24 h.

TABLE 2

| Samples | Moisture permeability (g/m² · 24 h) |
| --- | --- |
| Example of the present invention (Example of FIG. 1) | 308 |
| Example of the present invention (Example of FIG. 7) | 607 |
| Comparative Example 1 (water-based PU) | 129 |
| Comparative Example 2 (oil-based PU) | 199 |

TABLE 2-continued

| Samples | Moisture permeability (g/m² · 24 h) |
| --- | --- |
| Comparative Example 3 (PVC) | 10 |
| Comparative Example 4 (natural leather) | 557 |

That is, as shown in Table 2, considering that the moisture permeability of Comparative Example 4 (natural leather) is 557 g/m²·24 h, it can be seen that the artificial leather 100 of the present invention (Example of FIG. 7) has better moisture permeability than natural leather.

DESCRIPTION OF SYMBOLS

100: ARTIFICIAL LEATHER 110: FABRIC LAYER
111: BINDER LAYER 120: WATER-BASED POLYURETHANE FOAM LAYER
111a, 121, 131: OPEN CELLS 130: SKIN LAYER
140: SURFACE TREATMENT LAYER 200: ARTIFICIAL LEATHER MANUFACTURING APPARATUS
210, 250: WINDING ROLL 211: RELEASE PAPER
220: CONVEYING ROLLERS 221: COATING KNIVES
230: FOAM GENERATOR 240: OVEN

The invention claimed is:

1. An artificial leather comprising:
a fabric layer;
a binder layer laminated on an upper portion of the fabric layer;
a water-based polyurethane foam layer laminated on an upper portion of the fabric layer;
a skin layer laminated on an upper portion of the water-based polyurethane foam layer; and
a surface treatment layer laminated on an upper portion of the skin layer,
wherein the water-based polyurethane foam layer comprises open cells formed through mechanical foaming,
wherein the binder layer comprises open cells formed through foaming,
wherein the skin layer comprises open cells formed through foaming, and
wherein the water-based polyurethane foam layer is formed to have a density of 200 to 850 g/L, a thickness of 50 to 600 μm, and a size of the open cells of 50 μm to 90 μm.

2. The artificial leather according to claim 1, wherein the fabric layer is formed using any one of fabric, knits, impregnated tricot, impregnated nonwoven fabric, dope dyed yarn, and nonwoven fabric.

3. The artificial leather according to claim 1, wherein the binder layer is formed using any one of a water-based polyurethane binder, an oil-based polyurethane binder, a solvent-free polyurethane binder, and a hot-melt adhesive.

4. The artificial leather according to claim 1, wherein the skin layer is formed of water-based polyurethane or oil-based polyurethane.

5. The artificial leather according to claim 1, wherein the surface treatment layer is formed through any one of water-based surface treatment, oil-based surface treatment, and oil-based/water-based complex surface treatment.

6. A method of manufacturing the artificial leather of claim 1, comprising:
a first step of conveying release paper wound on a winding roll in one direction;
a second step of applying a gel-phase resin mixture to a predetermined thickness to an upper portion of the conveyed release paper, and performing heat drying to form the skin layer;

a third step of preparing a foam paste in which fine air layers are formed using a foam generator;

a fourth step of applying the prepared foam paste to the upper portion of the skin layer, and performing curing and drying to form the water-based polyurethane foam layer having open cells;

a fifth step of applying the binder layer to the upper portion of the water-based polyurethane foam layer;

a sixth step of laminating fabric on the upper portion of the applied binder layer, and performing drying and curing to form the fabric layer;

a seventh step of peeling off the release paper; and an eighth step of forming the surface treatment layer on the upper portion of the skin layer from which the release paper has been peeled off.

7. The method according to claim 6, wherein the heat drying process, the curing and drying process, and the drying and curing process for laminating the skin layer, the foam layer, and the fabric layer are performed in an oven at 80 to 140° C. for 2 to 5 minutes.

* * * * *